2,813,887
PREPARATION OF ARYLHALOSILANES

Hugh E. Ramsden, Metuchen, N. J., assignor to Metal & Thermit Corporation, New York, N. Y., a corporation of New Jersey No Drawing. Application November 20, 1953, Serial No. 393,514

7 Claims. (Cl. 260—448.2)

The present invention relates to a process of making arylhalosilanes, such as phenylchlorosilanes, through the use of Grignard reagents. Such arylhalosilanes, at the present time, are useful as intermediates in the preparation of silicones.

One object of the present invention is to increase the yield of arylhalosilanes in the reaction between an arylmagnesium halide (Grignard reagent) and a silicon halide.

Another object is to provide a new catalyst for increasing the yield of arylhalosilanes in the reaction between an arylmagnesium halide and a silicon halide.

The Grignard reagent employed in the process of the present invention may be made as, for example, by the reaction between chlorobenzene and magnesium. In the preparation of the Grignard reagent, in place of chlorobenzene in this reaction, other aryl halides which may be employed are bromobenzenes, iodobenzenes, p-tolyl chloride, p-tolyl bromide, m-chlorotoluene, m-bromotoluene, m, o or p-chloro or bromoanisoles or phenetoles, chloro or bromoxylenes, chloro or bromoethylbenzenes, chloro or bromobiphenyls, chloro or bromonaphthalenes, chloro or bromoterphenyls and chloro or bromodiphenylethers. Different phenylhalosilanes may be made stepwise from this Grignard reagent. The following reactions illustrate these stepwise formations as applied to the specific preparation of phenylchlorosilanes but these reactions are applicable to a method of making other arylsilicon halides:

$C_6H_5MgCl + SiCl_4 \rightarrow C_6H_5SiCl_3(I) + MgCl_2$
$C_6H_5SiCl_3 + C_6H_5MgCl \rightarrow (C_6H_5)_2SiCl_2(II) + MgCl_2$
$C_6H_5SiCl_2 + C_6H_5MgCl \rightarrow (C_6H_5)_3SiCl(III) + MgCl_2$ In place of the silicon tetrachloride $SiCl_4$ in the above reaction with the Grignard reagent, other silicon chlorides having the general formula $R_nSiCl_{4-n}$ may be employed. In this general formula, $n$ is any integral number from zero to 2, and R may be a hydrogen or a hydrocarbon radical substituted or unsubstituted, such as methyl, ethyl, propyl, butyl, phenyl, tolyl, etc., and the R's may be the same or different. Examples of such compounds are $HSiCl_3$
$RSiCl_3$
$RHSiCl_2$
$R_2SiCl_2$ wherein R is a hydrocarbon radical, as indicated above.

In accordance with the present invention, there is employed in connection with any or all of the reactions indicated above, a cobalt salt and more specifically a cobalt halide such as cobalt chloride $CoCl_2$ as a catalyst. The amount of this catalyst added is small, varying between 1% and 2% by weight of the silicon tetrahalide. Larger amounts of this catalyst do not improve materially the yield of phenylhalosilanes.

It is desirable that the catalyst $CoCl_2$, in the preparation of phenylchlorosilanes in accordance with the above 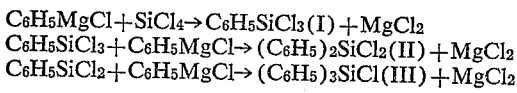 reactions, be added to the silicon tetrachloride before the Grignard reagent is added thereto or be added to the mixture of silicon tetrachloride and Grignard reagent.

After the reaction of the Grignard reagent and silicon tetrachloride in the presence of the catalyst described is completed, the resulting mixture is filtered and the filtrate may be fractionated to obtain the different phenylhalosilanes. The yield is between 60–90% by weight based on silicon.

In the reactions indicated above, compounds I, II and III are useful, but compounds I and II are the more desirable. The conditions which favor the preparation of compounds I and II over the preparation of compound III are: (1) the addition of the Grignard reagent to the silicon tetrachloride to maintain a local excess of silicon tetrachloride and to favor stepwise reactions: (2) the maintenance of a low reaction temperature to keep the silicon tetrachloride from boiling out of the reaction zone: (3) the efficient stirring of the reaction mixture; and (4) the slow addition of the phenylmagnesium chloride. Use of excess silicon tetrachloride tends to cause a greater formation of compounds I and II at the expense of compound III, whereas the use of stoichiometric quantities to form compound II yields a larger quantity of compound III. Thus, it is preferred to employ silicon tetrachloride in slight excess of that necessary to form the compound II.

There will be obtained by the process described above, the compounds I, II and III, a small amount of residue as well as some biphenyl. The residue may be partially $(C_6H_5)_4Si$, although it is likely that there has been some hydrolysis of the chlorine groups to give compounds such as:

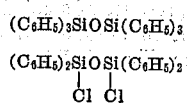

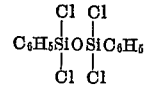

and

and higher polymers.

These, it is believed, arise from the use of silicon tetrachloride which has contacted moisture to form $Cl_3SiOSiCl_3$ or from the presence of moisture in any of the reactants, or from the pickup of moisture from air during transfer. It has been found that the rigid exclusion of moisture and the distillation of the silicon tetrachloride before use, cuts down on this residue.

Ordinarily phenylmagnesium chloride contains as impurities such compounds as xenylmagnesium chloride and terphenylmagnesium chloride, and these, it is believed, form silicon compounds high-boiling enough to remain as part of the residue. The contribution of the impurities in the phenylmagnesium chloride to this residue may be reduced by employing a purer form of phenylmagnesium chloride.

Another contribution to the residue is believed due to the oxidation by air of the Grignard reagent arylmagnesium chloride, to $C_6H_5OMgCl$ producing

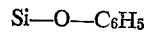

compounds, which again are high-boiling and remain behind in the residue. This is avoided by carrying out the reactions of the present invention in an inert atmosphere, such as nitrogen.

The following example illustrates one way in which the principle of the invention has been applied, but is not to be construed as limiting the broader aspects of the invention:

Phenylmagnesium chloride (from 1 mole of Mg and 5 moles of chlorobenzene) was added slowly to a mixture of 0.45 mole of silicon tetrachloride, 0.8 g. of cobalt chloride, and a few ml. of chlorobenzene. Temperature of the reaction rose to 103° C. After the addition, the reaction was heated to reflux until the reaction mix was tan in color. It was filtered; the filtrate was stripped of chlorobenzene at 22 mm., and fractionated to give the following crude fractions:

| No. | Head | Pressure, mm. | Weight, g. | Percent Si | Percent Cl |
|---|---|---|---|---|---|
| 1 | 66-71 | 5 | 12 | 13.8 | |
| 2 | 115-130 | 5 | 11.9 | 9.1 | 26.2 |
| 3 | 132-148 | 5 | 21 | 10.2 | 23.3 |
| 4 | 151-163 | 5 | 7.5 | 9.3 | 23.9 |
| Residue | | | 43.3 | 0.3 | 13.0 |
| (water-insoluble residue from MgCl$_2$ Salt) | | | 10.3 | 13.62 | |

This corresponds to a yield of 88% based on silicon. Yields of the order of 40% are obtained without this catalyst.

While the invention has been described with particular reference to a specific embodiment, it is to be understood that it is not to be limited thereto but is to be construed broadly and restricted solely by the scope of the appended claims.

What is claimed is:

1. The process of preparing an arylhalosilane, which comprises reacting an arylmagnesium halide with a silicon halide in the presence of catalytic amounts of a cobalt salt.

2. A process of preparing a phenylhalosilane which comprises reacting a phenylmagnesium halide with a silicon halide in the presence of a cobalt halide, said cobalt halide being present in amounts ranging from 1% to 2% by weight of the silicon halide.

3. The process of preparing a phenylchlorosilane which comprises reacting phenylmagnesium chloride with silicon tetrachloride in the presence of catalytic amounts of cobalt chloride.

4. The process as described in claim 3, wherein the cobalt chloride is present in amounts ranging from 1% to 2% by weight of the silicon tetrachloride.

5. The process of preparing phenylchlorosilanes which comprises reacting phenylmagnesium chloride with silicon tetrachloride in the presence of catalytic amounts of cobalt chloride, removing the precipitate formed from the reaction mixture and subjecting the resulting liquid to fractional distillation to effect separation of the different phenylchlorosilanes.

6. The process of preparing phenylchlorosilanes, which comprises adding phenylmagnesium chloride to silicon tetrachloride in the presence of catalytic amounts of cobalt chloride to effect a reaction while maintaining a local excess of said silicon tetrachloride.

7. The process of preparing phenylchlorosilanes, which comprises reacting phenylmagnesium chloride with a silicon tetrachloride in the presence of catalytic amounts of cobalt chloride, the silicon tetrachloride being in slight excess of stoichiometric proportions for the formation of diphenyl silicon dichloride.

References Cited in the file of this patent

UNITED STATES PATENTS

| | | |
|---|---|---|
| 2,258,279 | Rochow | Oct. 7, 1941 |
| 2,426,122 | Rust | Aug. 19, 1942 |
| 2,404,235 | Kharasch | July 16, 1946 |

OTHER REFERENCES

Kharash et al.: "Jour. Am. Chem. Soc.," vol. 65 (1943), pages 492–495.

Rochow: "Chemistry of the Silicones," 2nd edition (1951), pages 34–36.